Figure 1:
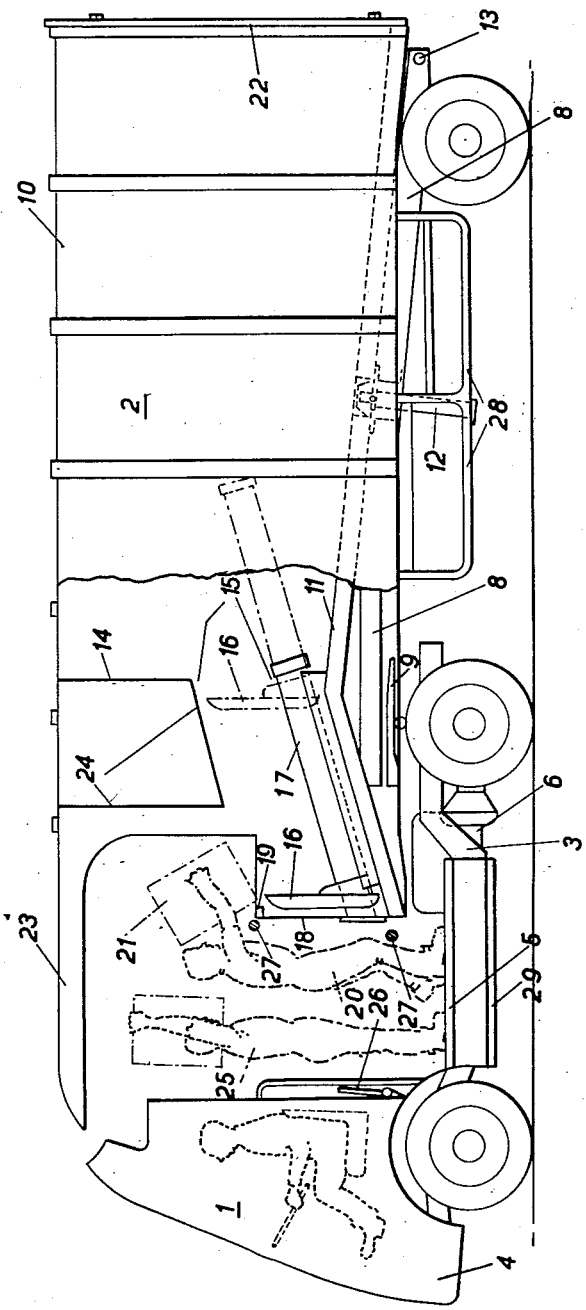

Oct. 31, 1961    E. HAUGHTON    3,006,492
LOAD CARRYING VEHICLE
Filed Aug. 12, 1957    5 Sheets-Sheet 2

Inventor
ERNEST HAUGHTON
By
Mead, Browne, Schuyler & Beveridge
Attorneys

Oct. 31, 1961     E. HAUGHTON     3,006,492
LOAD CARRYING VEHICLE

Filed Aug. 12, 1957     5 Sheets-Sheet 3

Inventor
ERNEST HAUGHTON
By Mead, Browne, Schuyler & Beveridge
Attorneys

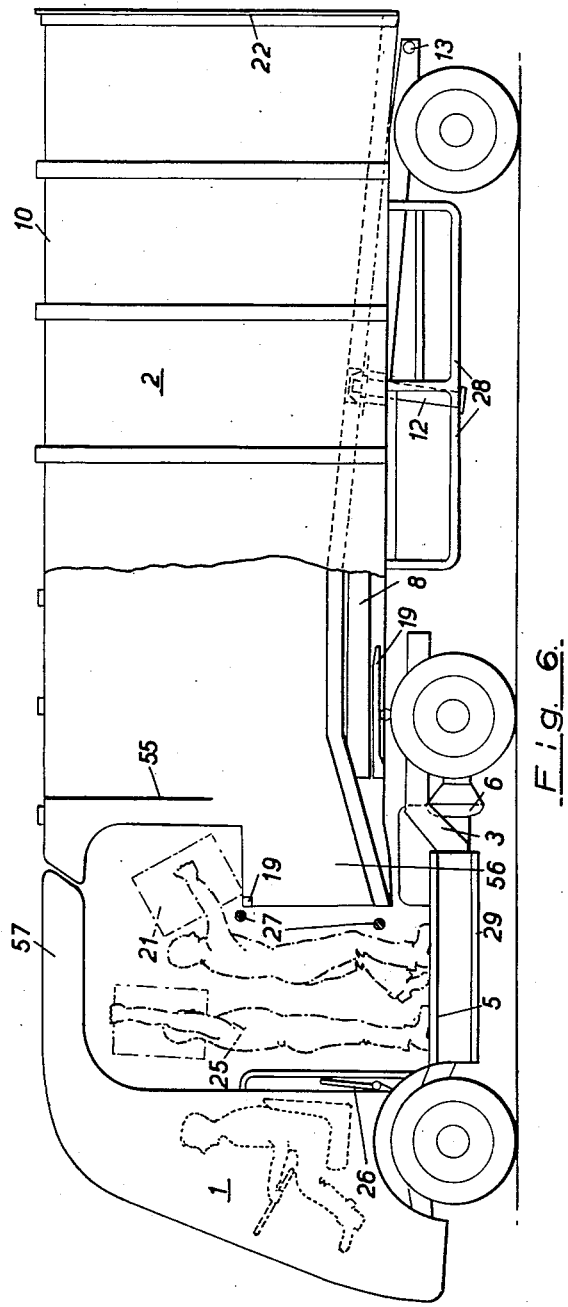

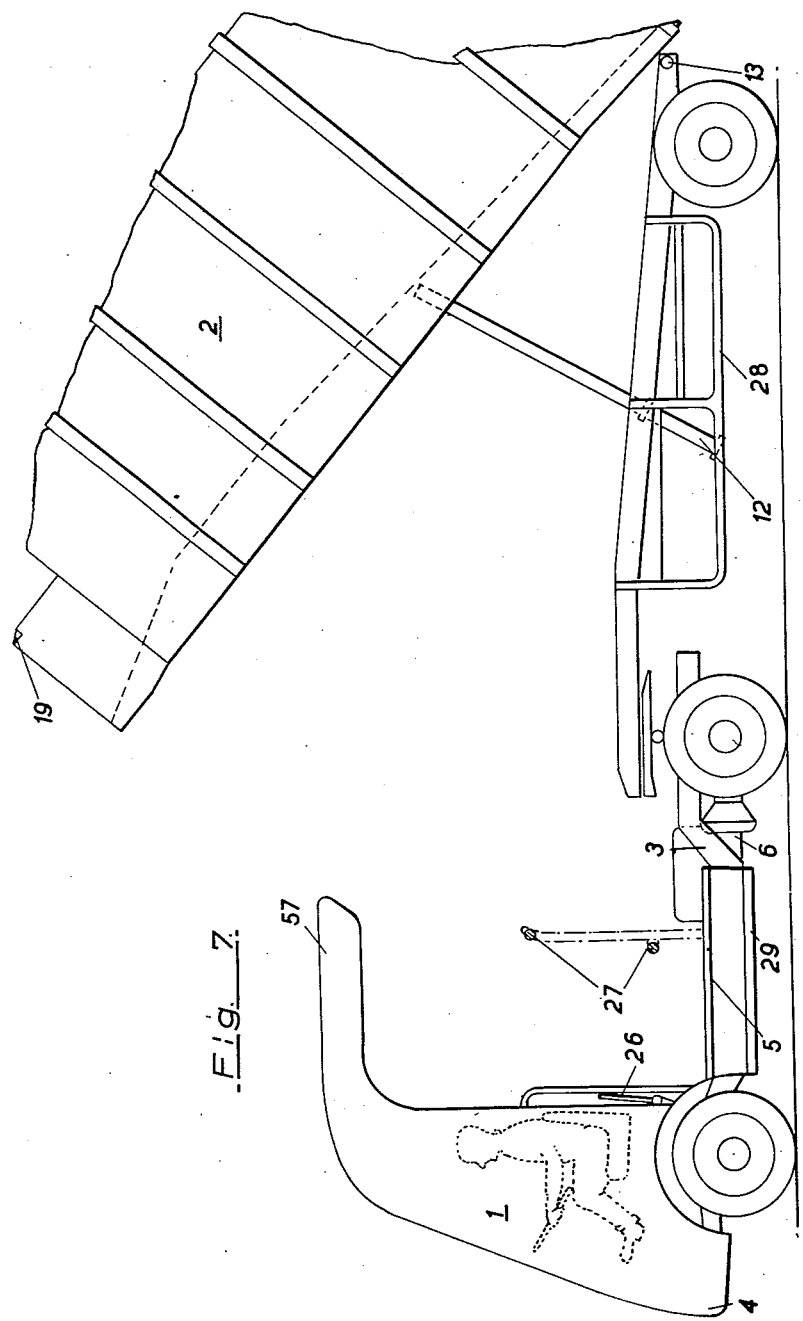

United States Patent Office 3,006,492
Patented Oct. 31, 1961

3,006,492
LOAD CARRYING VEHICLE
Ernest Haughton, Redlumbs, Scarth Hill, Ormskirk, England, assignor of one-half to The Lord Mayor, Aldermen and Citizens of the City of Liverpool, Lancashire, England
Filed Aug. 12, 1957, Ser. No. 677,499
7 Claims. (Cl. 214—510)

The present invention relates to load carrying tipping vehicles and is especially applicable to vehicles for the collection and disposal of refuse.

It is desirable that refuse collecting vehicles should be so constructed that they can be loaded without undue fatigue on the part of the crew but that on the other hand the wheels of the vehicle should not be so small as to impair the manoeuvrability of the vehicle on uneven ground such as is found at refuse dumps. It is desirable that the body should be capable of being reasonably completely filled and that the crew should not need to enter the vehicle body to achieve this. It is also desirable to minimise the blowing away of fragments of refuse when loading and to provide some protection for the crew when loading and travelling in bad weather.

It is the object of the present invention to provide a vehicle which will reasonably satisfy these desiderata.

According to the present invention a load carrying articulated vehicle comprises a tractor and a semi-trailer formed to provide a platform for personnel in front of the forward end of the trailer body which is capable of being tipped rearwardly and is provided with a loading opening at its forward end through which the body can be loaded from the platform.

The invention thus includes a semi-trailer vehicle having a rearwardly tipping body with a loading opening at its forward end through which the load can be tipped into the body.

The invention furthermore includes a tractor vehicle constructed to support and tow a semi-trailer and formed with a personnel platform extending thereacross between the driving position and the position at which the semi-trailer is adapted to be supported thereon.

The platform should be at a level such that it can conveniently be reached by only one intermediate step and should be arranged for convenient access from both sides of the vehicle. It should be long enough to enable a person carrying a refuse container to pass freely behind another person depositing the contents of another container into the trailer body.

The loading opening in the trailer preferably extends substantially completely across the forward end of the body and a power loading hopper may be provided in the forward end of the body for the rearward displacement of material from beneath the loading opening.

The tractor is preferably provided with a closed cab for the driver and in the application of the invention to a refuse collecting vehicle the trailer body is preferably also closed and the platform protected by a canopy extending across the platform from either the trailer body or from the cab of the tractor. For the transport of the crew beneath the canopy a tip-up seat may be provided and this may be hinged to the back of the cab.

The engine of the tractor may be disposed to the rear of the loading platform so that the tractor transmission need not pass beneath the platform. The engine, gear box and transmission may be of unit form associated with the tractor rear axle. Alternatively the engine and gear box may be mounted in the normal position and the propeller shaft taken under the platform from a transfer box mounted on the rear of the main gearbox.

The fact that the loading height in relation to the ground is not so important with front end loading according to the present invention, as has been the case in previous forms of refuse vehicles without a loading platform, enables the semi-trailer to be arranged at more or less the optimum level and the wheel diameter may be chosen to suit the conditions under which the vehicle will have to work. The trailer may be provided with sufficient ground clearance to enable a salvage rack or container to be underslung from the semi-trailer chassis frame. The salvage rack can be used for articles of long or bulky nature which cannot satisfactorily be handled by the power loading mechanism.

The present invention includes a power loaded tipping vehicle in which a power loading hopper is disposed at one end of a load carrying body which may be tipped independently of the power loading hopper.

The tipping of the body independently of the power loading hopper provides the vehicle with greater stability when in the tipped condition as the centre of gravity remains at a lower level than is the case when the hopper is raised with the tipping body. In addition less power is required for tipping due to the lower weight being tipped. Also the elevated surface area exposed to wind loading is considerably reduced.

An articulated vehicle having a tipping trailer presents special problems relating to the stability of the vehicle when in a tipped condition. In particular the steering angle between the semi-trailer and the tractor must not be too great when tipping.

The invention includes an articulated vehicle having a tractor and a semi-trailer with a tipping body in which a protective device associated with the tractor and the semi-trailer is adapted to prevent tipping of the trailer body, or if unduly tipped to reduce the extent thereof, when the steering angle exceeds a given degree.

The protective device may include two electric switches resiliently mounted on the semi-trailer chassis and a member fixed to the tractor chassis which is disposed midway between the switches when the steering angle is zero and which is adapted to actuate the switches when the steering agnle exceeds said given degree. The switches may be connected in parallel in a series circuit which includes a battery and a solenoid operated valve which is adapted when energized to connect the hydraulic tipping cylinders to exhaust.

It is also undesirable that a tipping vehicle should be tipped when the axles supporting the tippable portion deviate far from the horizontal and the invention further includes a tipping vehicle in which a protective device associated with each axle directly supporting a tippable section of the vehicle is adapted to prevent tipping or if tipped to reduce the extent thereof when the inclination of any one of said axles exceeds a safe tipping angle.

The device may include pendulum switches one of which is mounted on each of said axles and each of which is adapted to complete an electric circuit controlling a solenoid operated valve when the axle on which it is mounted exceeds said safe tipping angle. The solenoid valve when energised is adapted to connect the hydraulic tipping cylinders to exhaust.

When used with an articulated tipping vehicle the pendulum switches may be connected in the same circuit as the switches which are adapted to prevent tipping with unsafe steering angles, and they may be provided on both the semi-trailer axle and the tractor rear axle.

Figure 2:
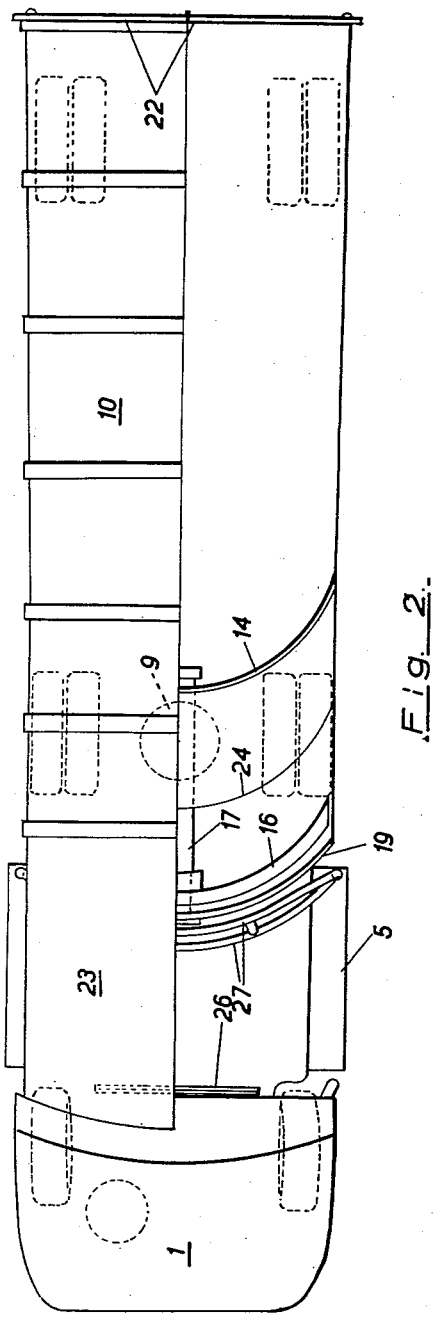
Figure 3:
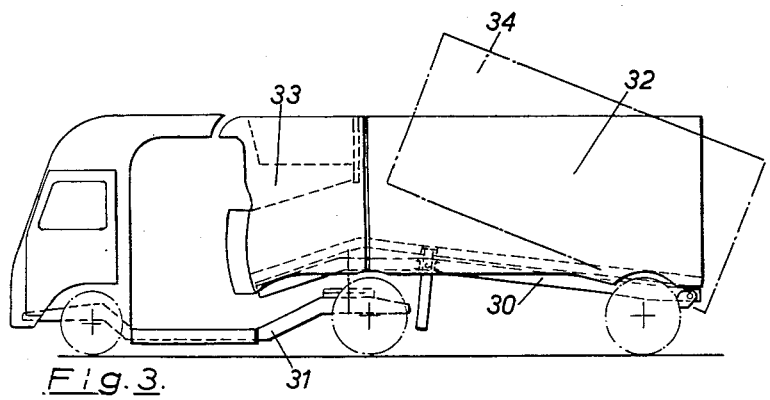
Figure 4:
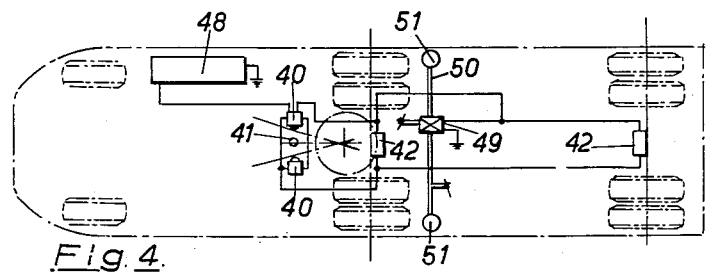
Figure 5:
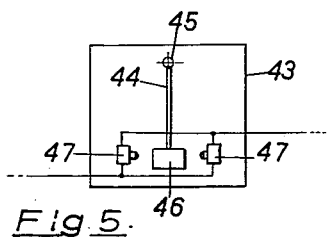

The invention will be further described by way of example with reference to the accompanying drawings which are somewhat diagrammatic and comprise:

FIG. 1 which is a side elevation of one embodiment of an articulated refuse collecting vehicle, the elevation being partly broken away to show the shape and disposition of certain of the parts at the centre section of the vehicle, FIG. 2 which is a part sectional plan view corresponding to FIG. 1;

FIG. 3 which is a diagrammatic side view of a further embodiment;

FIG. 4 which is a diagrammatic illustration of protective devices according to the present invention;

FIG. 5 which is a detail view relating to FIG. 4;

FIG. 6 which is a side elevation of a vehicle similar to that shown in FIG. 1 but slightly modified, and FIG. 7 which illustrates the vehicle shown in FIG. 6 with the body tipped.

The vehicle illustrated in FIGS. 1 and 2 comprises a tractor 1 articulated to a semi-trailer 2. The tractor chassis frame 3 carries a cab 4 behind which is disposed a loading platform 5. An engine, gear box and transmission unit 6 associated with the tractor rear axle is mounted on the chassis 3 behind the platform 5.

A semi-trailer chassis frame 8 is supported on a turntable 9 on the tractor chassis 3 and carries a tippable closed body 10 built on a body floor frame 11. The body can be tipped by means of hydraulic tipping cylinders 12 about a tipping axis 13.

Towards its forward end the body 10 is provided in an upper region with a bulkhead 14 beneath which is a lower loading aperture 15. A power loading hopper disposed in front of the loading aperture includes a pusher plate or loading ram 16 which may be urged upwardly and rearwardly towards the aperture 15 by means of a hydraulic power cylinder 17 and is formed so as substantially to close the aperture 15 when in its rearmost position. In its foremost position the pusher plate 16 is disposed behind a loading barrier 18 and is overlapped by an inwardly directed barrier flange or rave rail 19 at the upper edge of the barrier.

With the plate 16 in its foremost position operators standing on the platform 5, such as the man illustrated diagrammatically at 20, may feed refuse from refuse containers such as 21 over the barrier flange 19 to behind the pusher plate 16 which may be moved into its rearmost position by means of the power cylinder 17 to displace the refuse rearwardly into the body 10. When the body 10 is loosely filled with refuse further loading with the loading ram will compact the load.

The body 10 is provided with rear hinged doors 22 which may be opened for tipping. The upward slope of the power loading hopper floor from the barrier 18 to the aperture 15 enables the body frame 11 and hence the body floor to slope downwardly from the aperture 15 to the rear of the body. The resultant outward taper of the body in the tipping direction materially assists tipping. For this purpose the sides of the body 10 also taper out slightly towards the rear thereof.

The trailer body roof extends forwardly to form a canopy 23 which provides weather protection for operators working or travelling on the platform 5. Cross walls 24 within the semi-trailer serve to compact and guide each charge as it is rearwardly displaced from loading hopper. A tip-up seat 26 hinged to the rear of the cab 4 is provided for the comfort of operators travelling on the platform 5 and for whose protection guard rails 27 are provided at the rear end of the platform.

Access to the platform 5 is provided at each side of the vehicle by means of a single step 29 and the platform is of sufficient extent in the lengthwise direction of the vehicle to allow one operator to pass behind another who is feeding the power loader, as illustrated by the operators shown diagrammatically at 20 and 25.

The front of the canopy 23 is radiused about the turntable axis, as is the corresponding rear portion of the tractor cab. The barrier 18 and the pusher plate 16 when in its outermost position are also radiused about the turntable axis, and the bulkhead 14 is radiused to correspond to the plate 16 when in its rearmost position.

A salvage rack or basket 28 is underslung from the semi-trailer chassis 8 and can be used for carrying long or bulky articles not acceptable in the loading hopper.

The articulated vehicle illustrated in FIG. 3 has a semi-trailer chassis frame 30 which is articulated to a tractor chassis frame 31 and carries a semi-trailer body formed of a rear tippable portion 32 and a front fixed portion 33. The rear portion 32 may be tipped to the position shown in outline at 34 independently of the front portion 33. Apart from the formation of the trailer body in two portions and the tipping of the rear portion only, the vehicle illustrated in FIG. 3 is substantially similar to the embodiment already described with reference to FIGS. 1 and 2, the front body portion 33 comprising a power loading hopper substantially as described with reference to FIGS. 1 and 2.

At its forward end the rear body portion 32 is provided with a fixed closure plate above the level of the pusher plate and a movable closure which can be moved downwardly below the fixed closure plate to retain the refuse in the body portion 32 when being tipped.

FIG. 4 illustrates a protective system according to the invention applied to an articulated vehicle having a tippable semi-trailer such as already described with reference to the preceding figures. Electric switches 40 are resiliently mounted on the chassis frame of the semi-trailer on either side of the central axis thereof and an element 41 is disposed on the central axis of the tractor chassis frame so as to be midway between the contacts 40 when the steering angle is zero. When the steering angle exceeds a given amount the element 41 engages one or other of the switches 40 to close the switch contacts thereof. Both switches 40 are connected in parallel with two pendulum switches 42, one of which is mounted on the rear tractor axle and the other of which is mounted on the semi-trailer axle. The pendulum switches are illustrated diagrammatically in FIG. 5 in which a casing 43 houses a pendulum 44 which is freely pivoted about an axis 45. The pendulum switches are mounted on the axles so that the pendulum axis 45 extends horizontally in the fore and aft direction of the vehicle when the latter is on level ground. In this position a pendulum weight 46 is disposed midway between two electric switches 47. When the inclination of the axle on which the switch is mounted exceeds a certain safe value for tipping the pendulum weight 46 actuates one or other of the switches 47 which are connected in parallel.

The parallel circuit containing all the switches 40 and 47 is connected in a series circuit including a battery 48 and a solenoid operated exhaust valve 49. Actuation of any one of the switches causes energisation of the solenoid 49 to connect to exhaust a pressure pipe line 50 adapted to supply pressure fluid to hydraulic tipping cylinders 51. Thus when the inclination of the axles or the steering angle exceed safe values the solenoid 49 will be actuated to prevent operation of the cylinders 51 to provide tipping or if the trailer is already tipped will allow it to return rapidly to its untipped condition, i.e. in about two to five seconds. The allowable steering angle and axle inclination angles for tipping will depend upon the design, weight distribution and loading characteristics of the vehicle concerned but with many articulated vehicles it has been found that tipping may safely be proceeded with if the steering angle does not exceed about 5° and the axle inclination does not exceed about 2°. Thus it will be seen that the pendulum switches 42 must be sensitive to small changes in inclination and the switches 47 should be corespondingly sensitive, for example switches of the type normally known as "microswitches" are suitable.

The vehicle shown in FIGS. 6 and 7 comprises a tractor 1 and semi-trailer 2 largely similar to those of FIG. 1 provided with a loading hopper at the front of the trailer body from which the pusher plate 16 and hydraulic cylinder 17 of FIG. 1 are omitted and in which the bulkhead 14 and cross walls 24 of FIG. 1 are replaced by a single bulkhead 55. In this arrangement a number of refuse containers 21 are discharged into the loading hopper 56 at the front end of the body 2 and the body is then inclined rearwardly and downwardly with the aid of the tipping cylinders 12 as illustrated in FIG. 7 to enable the refuse to be fed into the rear part of the body by gravity.

In the arrangement of FIGS. 6 and 7 the awning 23 of FIG. 1 is replaced by an awning 57 extending rearwardly from the tractor cab instead of forwardly from the trailer body.

I claim:

1. A load carrying vehicle for the transport of compactible material comprising a tractor and semi-trailer in articulated union and embodying three axles namely a front axle near the front of the tractor, an intermediate driven axle near the rear of the tractor and a rear axle near the rear of the semi-trailer, a driving position on the tractor approximately above the front axle, a transverse walk-through platform on the tractor between the front and intermediate axles and a transverse partition between the driving position and the platform to isolate the driving position from the platform, which latter extends from side by side of the tractor so as to be accessible from both sides of the tractor and is at a relatively low level not significantly above the level of the axles and substantially below the uppermost peripheries of the tyres of the wheels, a closed body on the trailer capable of being rearwardly tipped and extending forwardly to said platform beyond the intermediate axle and provided with a loading opening at its forward end above the level of the platform and with doors at its rearward end through which the load can be discharged and against which the load can be compacted by tipping of the body and means for elevating the forward end of the body into the rearwardly tipping position.

2. A vehicle according to claim 1 comprising a closed body on the trailer which extends forward substantially beyond the intermediate axle but not significantly rearwardly beyond the rear axle.

3. A vehicle according to claim 1 comprising a power loading ram in the trailer body at the forward end thereof beneath the loading opening, said power loading ram being capable of being brought into operation when the body is tipped to enhance the compaction of the load.

4. A vehicle according to claim 1 in which the forward end of the trailer body is formed as a non-tipping loading hopper fixed to the trailer chassis separate from the remainder of the trailer body which can be rearwardly tipped.

5. A vehicle according to claim 1 comprising a canopy extending forwardly from the forward end of the trailer body and above the platform.

6. A vehicle according to claim 1 comprising a cab enclosing the driving position and a canopy extending rearwardly from the cab and over the platform.

7. A load carrying vehicle for the transport of compactible material comprising a tractor and semi-trailer in articulated union and embodying front wheels near the front of the tractor, a driven axle near the rear of the tractor and rear wheels supporting the semi-trailer, a driving position on the tractor approximately above the front wheels, a transverse walk-through platform on the tractor in front of the driven axle and a transverse partition between the driving position and the platform to isolate the driving position from the platform, which latter extends from side by side of the tractor so as to be accessible from both sides of the tractor, a closed body on the trailer capable of being rearwardly tipped and extending forwardly to said platform beyond the driven axle and provided with a loading opening at its forward end above the level of the platform and with doors at its rearward end through which the load can be discharged and against which the load can be compacted by tipping of the body and means for elevating the forward end of the body into the rearwardly tipping position.

References Cited in the file of this patent

UNITED STATES PATENTS

| | | |
|---|---|---|
| 1,755,547 | Lima | Apr. 22, 1930 |
| 2,459,473 | Troutman | Jan. 18, 1949 |
| 2,574,585 | Nielsen | Nov. 13, 1951 |
| 2,603,368 | Vance | July 15, 1952 |
| 2,741,383 | Leckert | Apr. 10, 1956 |
| 2,750,055 | Huffines | June 12, 1956 |
| 2,800,234 | Herpich et al. | July 23, 1957 |
| 2,846,267 | Fields | Aug. 5, 1958 |

FOREIGN PATENTS

| | | |
|---|---|---|
| 780,658 | France | Feb. 4, 1935 |